United States Patent [19]
Bird

[11] Patent Number: 5,967,568
[45] Date of Patent: Oct. 19, 1999

[54] PLASTIC PIPE ADAPTOR FOR A MECHANICAL JOINT

[75] Inventor: Edwin A. Bird, Ashdown, Ark.

[73] Assignee: M&FC Holding Company, Inc., Wilmington, Del.

[21] Appl. No.: 08/874,152

[22] Filed: Jun. 13, 1997

[51] Int. Cl.⁶ .................................................. F16L 33/213
[52] U.S. Cl. .......................... 285/258; 285/337; 285/423; 285/906
[58] Field of Search ..................................... 285/258, 423, 285/382.4, 382.5, 906; 29/507; 138/109

[56] References Cited

U.S. PATENT DOCUMENTS

| | | |
|---|---|---|
| 1,102,163 | 6/1914 | Opperud . |
| 1,181,856 | 5/1916 | Downer . |
| 1,484,140 | 2/1924 | Mallory ................................ 285/382.5 |
| 2,013,217 | 9/1935 | Olmstead . |
| 2,850,304 | 9/1958 | Wagner . |
| 2,901,024 | 8/1959 | Mardsen, Jr. . |
| 3,287,802 | 11/1966 | Robinson et al. . |
| 3,343,248 | 9/1967 | Silverman . |
| 3,429,587 | 2/1969 | Kish . |
| 3,538,792 | 11/1970 | Stillwagon, Jr. . |
| 3,575,447 | 4/1971 | Merkle .................................. 285/258 |
| 3,656,783 | 4/1972 | Reeder . |
| 3,762,173 | 10/1973 | Marsh . |
| 3,915,480 | 10/1975 | Kish, et al. . |
| 4,006,923 | 2/1977 | Wagner ............................ 285/258 X |
| 4,062,572 | 12/1977 | Davis . |
| 4,094,537 | 6/1978 | Lyall . |
| 4,119,335 | 10/1978 | Rieffle et al. . |
| 4,132,437 | 1/1979 | Green . |
| 4,136,897 | 1/1979 | Haluch . |
| 4,152,821 | 5/1979 | Scott ....................................... 29/507 |
| 4,192,534 | 3/1980 | Bernatt et al. . |
| 4,293,147 | 10/1981 | Metcalfe et al. . |
| 4,295,668 | 10/1981 | Louthan et al. . |
| 4,333,672 | 6/1982 | Arthur et al. . |
| 4,466,640 | 8/1984 | VanHoutte . |
| 4,482,170 | 11/1984 | Jacobson et al. . |
| 4,569,542 | 2/1986 | Anderson et al. . |
| 4,660,865 | 4/1987 | Workman . |
| 4,679,830 | 7/1987 | Kok . |
| 4,793,638 | 12/1988 | Baldwin, Jr. . |
| 4,850,620 | 7/1989 | Puls ..................................... 285/258 X |
| 4,867,485 | 9/1989 | Seckel ................................... 285/258 |
| 4,893,848 | 1/1990 | Melcher ................................ 285/258 |
| 4,997,214 | 3/1991 | Reese . |
| 5,069,490 | 12/1991 | Halen, Jr. . |

(List continued on next page.)

FOREIGN PATENT DOCUMENTS

| | | | |
|---|---|---|---|
| 2412697 | 10/1974 | Germany ............................ 285/382.5 |
| 2919939 | 11/1980 | Germany ............................... 285/253 |
| 28641 | 3/1904 | United Kingdom ............... 285/382.4 |
| 2083154 | 3/1982 | United Kingdom . |

OTHER PUBLICATIONS

U.S. Patent Application Serial No. 08/624,915—Filed Mar. 27, 1996.
U.S. Patent Application Serial No. 08/607,659—Filed Feb. 27, 1996.
Central Plastics Company, *Double 'O' Seal Transition Fittings.*

*Primary Examiner*—Dave W. Arola
*Attorney, Agent, or Firm*—Wood, Herron & Evans, L.L.P.

[57] ABSTRACT

A plastic pipe adaptor (10) includes a length of pipe (12) having a plastic pipe wall (14) with a substantially rigid pipe stiffener (32) disposed inside the pipe and a substantially rigid collar (34) disposed about the pipe exteriorly of the pipe wall (14), the collar having a recess (40) therein. The stiffener (32) and collar (34) are positioned such that a portion (50) of the plastic pipe wall is disposed between the stiffener (32) and the collar recess (40) and at least a portion (52) of the pipe stiffener is deflected outwardly against the pipe wall portion (50) by an amount sufficient to wedge the pipe wall portion (50) into engagement with the collar recess (40). The result is a firm grip to the pipe which allows the collar to serve as an attachment to another member such as a mechanical joint (30). A method of making the adaptor (10) is also described.

48 Claims, 3 Drawing Sheets

U.S. PATENT DOCUMENTS

| | | |
|---|---|---|
| 5,100,183 | 3/1992 | Montesi et al. . |
| 5,127,157 | 7/1992 | Oetiker . |
| 5,207,460 | 5/1993 | Oetiker ................................. 285/258 |
| 5,295,718 | 3/1994 | Bartholomew ........................ 285/258 |
| 5,326,137 | 7/1994 | Lorenz et al. ..................... 285/258 X |
| 5,430,929 | 7/1995 | Sanders . |
| 5,590,914 | 1/1997 | Platner .............................. 285/258 X |
| 5,655,796 | 8/1997 | Bartholomew . |

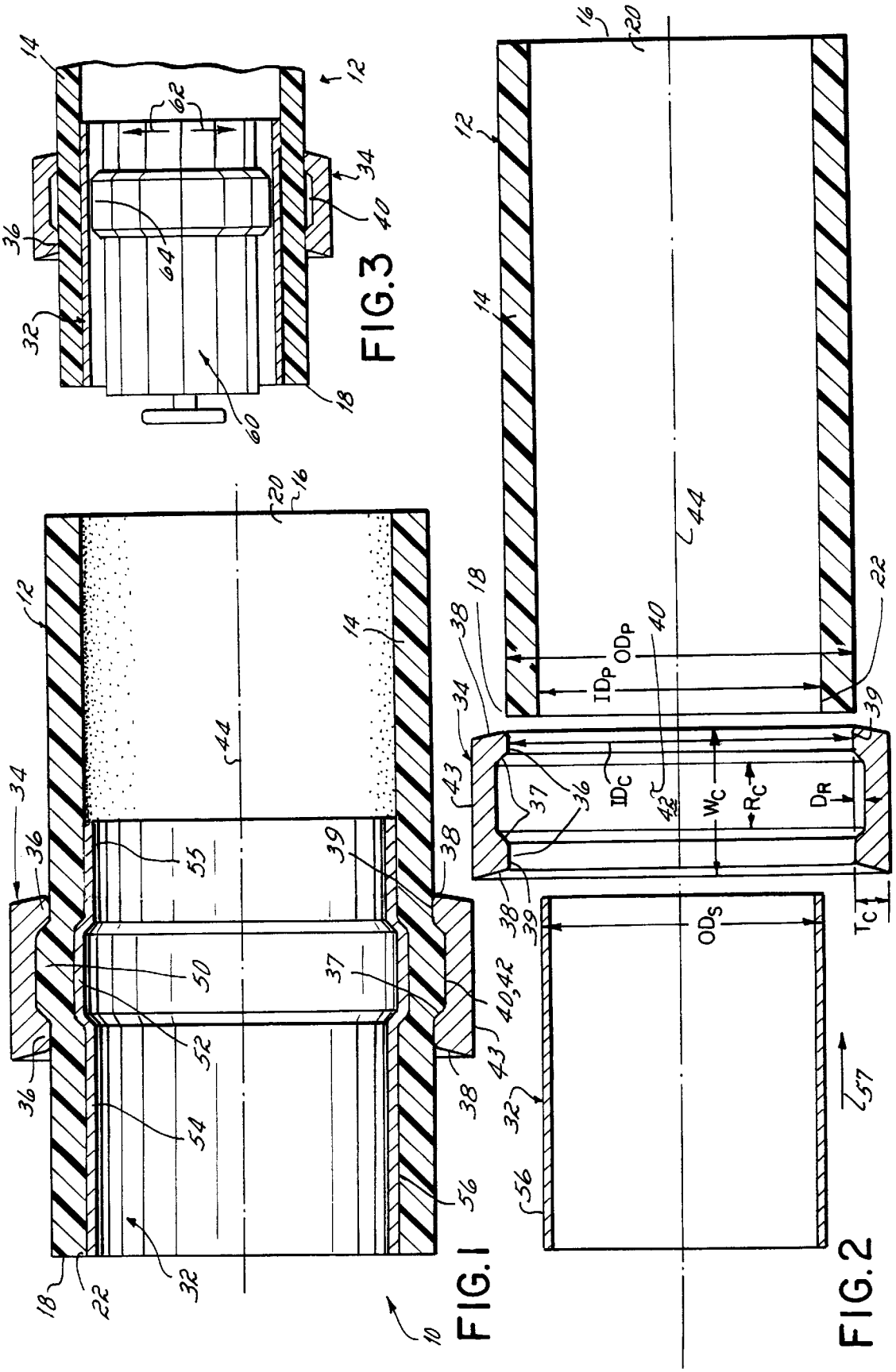

PLASTIC PIPE ADAPTOR FOR A MECHANICAL JOINT

BACKGROUND OF THE INVENTION

I. Field of the Invention

The present invention relates to adaptors for mechanically coupling plastic pipes to other members such as metal pipes, unions, and mechanical joints, and more particularly, to such adaptors for mechanically coupling polyolefin water pipes to cast iron mechanical joints.

II. Description of Prior Art

Typical water pipe systems use very rigid pipes, such as ductile or cast iron, concrete and/or PVC pipes which mate with fittings such as mechanical joints. While such pipes are advantageously strong, many are very heavy and cumbersome to work with, and in the case of iron suffer from corrosion. PVC pipe may crack when flexed and has numerous mechanical joints which present potential for leak sites. A substitute for such pipe is flexible polyolefin-type plastic pipes which are lightweight, easy to work with, corrosion resistant and are fused together at the joint to form a continuous pipe to thereby minimize leakage. Polyolefin pipe, however, suffers from certain drawbacks that have impeded widespread use in water pipe systems and the like.

In particular, mechanically mating the end of a polyolefin pipe to some of the other members in a water system, and particularly to metal mechanical joints, presents significant difficulties due, for example, to the cold flow properties of the polyolefin-type plastic. More specifically, the ends of such a pipe tend to deform under pressure leading to an inadequate seal at the mechanical connection. Moreover, the pipe end may work loose from the mechanical joint due, for example, to the greater expansion/contraction rate of that type of plastic as compared to other more rigid pipes. In such a case, the connection pulls apart.

To reduce the drawbacks of using polyolefin-type of plastic pipe, therefore, there has been a need to stiffen the pipe end so that it will not deform under pressure nor work lose from the joint. One approach utilizes a length of such pipe one end of which is adapted to couple to the polyolefin pipe of the water system in conventional manner such as butt fusion. The other end of the adaptor includes an integral flange to be gripped by the mechanical joint components. To form the flange, the end of the pipe may be extruded with a pipe wall that is much thicker than a typical pipe wall, which thickened end is then machined to define a nominal thickness pipe wall with the integral flange thereon. Such an approach is costly and of questionable vitality in that the flange may be insufficient to properly retain the pipe in sealing engagement with the mechanical joint.

Another approach force-fits a rigid tube such as a steel tube inside the polyolefin pipe at the pipe end in sealing engagement with the inner diameter of the plastic pipe wall. The rigid tube act as a stiffener at the pipe end. And while the stiffening tube is believed to provide better resistance to pipe end deformation, the polyolefin pipe end may still come loose from the mechanical joint.

SUMMARY OF THE INVENTION

The present invention provides an improved plastic pipe adaptor which not only provides resistance to deformation of the plastic pipe end, but also provides a reliable mechanical connection to the other members of the water system such as a mechanical joint so as to resist pulling away from the joint in use. To this end, and in accordance with principles of the present invention, a substantially rigid collar with at least one recess therein is disposed about the exterior of the plastic pipe with the stiffener positioned inside the pipe such that a portion of the plastic pipe wall is disposed between the stiffener and the collar recess. At least a portion of the stiffener is deflected outwardly against the pipe wall by an amount sufficient to wedge the pipe wall portion into engagement with the collar recess. The result is to deform the plastic pipe wall portion interiorly and exteriorly such that it is held captive between the substantially rigid stiffener and collar, to thereby resist deformation of the rest of the pipe end and provide a substantially rigid mating surface for mechanical connection of the pipe adaptor to another member of the water system such as a mechanical joint. The wedging of the pipe wall by the stiffener into the collar recess has the further advantage that forces tending to pull the pipe away from the connection also tend to further wedge the plastic pipe wall into the stiffener and the collar to thus reinforce the connection against axial pull-out.

The stiffener may be sized slightly smaller in diameter than the pipe inner diameter so that it may be easily slid therein and then expanded against the pipe wall. Alternatively, the stiffener may be sized to fit tightly with the pipe wall such that the stiffener must be force-fit into the pipe. In one version, the stiffener is a smooth, tubular member and an expander, which may have a hump conforming to the collar recess, is used to outwardly deflect at least a portion of the stiffener wall underlying the collar recess to accomplish the desired wedge of the plastic pipe wall thereat. In another version, the stiffener may support a projecting portion, such as an annular rib or activation ring, conforming to the collar recess. The stiffener is inserted until the rib is located at the desired location under the collar recess. The stiffener may then be expanded by a smooth expander such that the rib wedges the plastic pipe wall as desired while also expanding the rest of the stiffener against the pipe wall outside the collar. Alternatively, the ribbed stiffener may be forced into the pipe end until the rib is seated below the collar recess with the plastic pipe wall portion wedged as desired. The collar is advantageously sized slightly larger than the pipe so as to be easily slid thereover. The collar may also be provided with a plurality of recesses therein. The expander or stiffener projection, as applicable, is formed appropriately to match the recesses of the collar. Additionally, the collar may provide bearing surfaces on its outer side walls such as for being mechanically gripped between a mechanical joint and the follower gland therefor, or may include an attachment mechanism, such as a flange or groove, formed thereon for mechanically coupling directly to the other members of the water system.

By virtue of the foregoing, there is thus provided a plastic pipe adaptor that has desirable pipe end stiffening characteristics while also providing structure to mechanically secure the pipe end to another member such as a mechanical joint.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 1 is a cross-sectional view of a plastic pipe adaptor in accordance with the principles of the present invention;

FIG. 2 is an exploded, cross-sectional view of a first version of the components of the plastic pipe adaptor of FIG. 1 prior to assembly;

FIG. 3 is a cross-sectional, diagrammatic view of the components of FIG. 2 coaxially inserted together and showing a humped expander for purposes of forming the plastic pipe adaptor of FIG. 1;

DETAILED DESCRIPTION OF THE DRAWINGS

Figure 6:
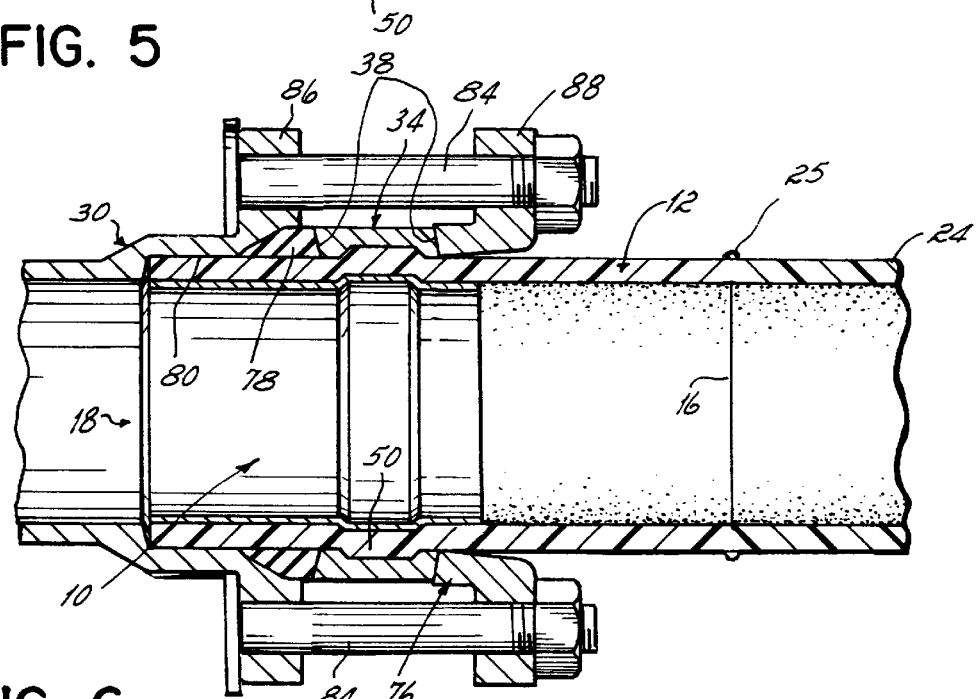
FIG. 6 is a cross-sectional view of the plastic pipe adaptor of FIG. 1 coupled to a mechanical joint of a water pipe system.

With reference to FIG. 1 there is shown a plastic pipe adaptor 10 constructed in accordance with the principles of the present invention. Adaptor 10 includes a length of plastic pipe 12 defined by a pipe wall 14 which is advantageously comprised of flexible plastic material such as polyolefin. Examples of such material is medium or high density polyethylene (MDPE or HDPE) pipe as is conventional. Pipe wall 14 terminates at its respective ends 16 and 18 in end openings 20 and 22, respectively. End 16 is adapted to couple to another length of plastic pipe 24 (FIG. 6), for example, in conventional manner such as with butt fusion or the like as at 25 (FIG. 6). End 18, on the other hand is adapted in accordance with the principles of the present invention to mechanically couple to another member of a water system such as a mechanical joint 30 (FIG. 6). To this end, a substantially rigid stiffener 32, such as a cylindrical type 304, 11 gauge stainless steel tube, is disposed inside pipe 12 adjacent end opening 22 thereof. Disposed completely about the periphery of pipe 12 exteriorly of pipe wall 14 is a substantially rigid collar 34 comprised for example of stainless steel, carbon steel, ductile iron or malleable iron. As seen in FIG. 2, collar 34 has a pair of spaced-apart inwardly directed projections 36 having opposed interior side walls 37, opposite exterior side walls 38 and innermost edges 39. Projections 36, and particularly interior side walls 37 thereof, define a recess 40 therebetween, with recess 40 having a substantially flat inner surface 42 (FIG. 2). Collar 34 also has an outer wall 43 generally parallel to surface 42. Exterior side walls 38 may be chamfered about 11° from perpendicular to the longitudinal axis 44 in accordance with AWWA standards for mechanical joints. Innermost edges 39 form a generally flat surface in cross-section which are radiused into interior and exterior sidewalls 37 and 38.

As may be seen from FIG. 1, stiffener 32 and collar 34 are positioned with respect to pipe wall 14 such that a portion 50 of pipe wall 14 is disposed between stiffener 32 and recess 40 of collar 34. Additionally stiffener 32 has a portion 52 underlying collar recess 40 and at least a leftward portion 54 extending to end opening 22 beyond the area underlying collar 34. Stiffener 32 may also include a rightwardly extending portion 55. Extended portion 54 and/or 55 may be snug against pipe wall 14. Stiffener portion 52 is deflected radially outwardly beyond the cylinder of tube 32 (such as defined by portion 54) by an amount sufficient to at least radially outwardly deform pipe wall portion 50 interiorly and exteriorly such that portion 50 is wedged by stiffener portion 52 into engagement with recess 40 such as against surface 42 and/or interior side walls 37 of projections 36. As a consequence, pipe wall portion 50 is securely gripped between stiffener 32 and collar 34.

With further reference to FIG. 2, it may be seen that adaptor 10 includes a typical piece of plastic pipe 12 having an inner diameter ($ID_P$) and an outer diameter ($OD_P$) defined by pipe wall 14 as is typical. Stiffener 32 is a generally tubular or cylindrical member with a smooth outer wall 56 defining an outer diameter ($OD_S$) which is selected to be either slightly smaller than the nominal inner diameter ($ID_P$) of pipe 12 so that stiffener may be readily slid inside pipe 12 along the path of arrow 57 in FIG. 2, or is about equal to $ID_P$ so as to be force-fit therein, until stiffener 32 is within pipe 12 adjacent end opening 22. Collar 34 has an inner diameter ($ID_C$) defined by the innermost edge 39 of each projection 36. The inner diameter ($ID_C$) defined by each projection 36 is advantageously the same, although they could be different, provided that each such inner diameter is not less than, and is preferably slightly greater than, the outer diameter ($OD_P$) of pipe 12. The depth of recess 40 ($D_R$) as measured from the innermost edges 39 of projections 36 to surface 42 is advantageously equal to about one-fifth to about one-half the wall thickness of pipe wall 14.

Advantageously, collar 34 has a thickness ($T_C$) measured from edges 39 to outer wall 43, an overall width ($W_C$) measured between exterior edges 38, and a collar recess width ($R_C$) measured between interior walls 37. Thus, for a standard HDPE pipe 12 with a dimension ratio (DR) of 11 for a six inch nominal ductile iron pipe size (such that pipe 12 has an $OD_P$ of 6.90 inches and a wall thickness of 0.627 inches), the following dimensions may be used:

| Dimension | Size (in inches) |
| --- | --- |
| $OD_S$ | 5.65 or 5.56 |
| $ID_C$ | 6.920 |
| $D_R$ | 0.125 |
| $T_C$ | .550 |
| $W_C$ | 2.500 |
| $R_C$ | 1.500 |

With the above, stiffener 32 may be as much as about 7 inches long with portion 54 being about 2.5 inches thereof such that portion 55 of stiffener 32 may extend as much as a couple of inches beyond collar 34.

As exemplified by FIGS. 2 and 3, adaptor 10 is formed by inserting stiffener 32 inside pipe 12 and placing collar 34 about pipe wall 14 such that portion 50 of pipe wall 14 is disposed between portion 52 of stiffener 32 and recess 40 of collar 34. Stiffener 32 may be force fit in place if $OD_S$ is about equal to $ID_P$ or may be easily slid in place if $OD_S < ID_P$, the latter being easier to work with. An expander 60 is inserted into stiffener 32 inside pipe 12 and expanded radially outwardly (as exemplified by double-headed arrow 62) to expand stiffener 32 into engagement with pipe wall 14. The expander 60 and method is generally as described in my copending U.S. patent application Ser. No. 08/624,915, filed Mar. 27, 1996, entitled "Method of Stiffening a Flexible Pipe", and my U.S. patent application Ser. No. 08/373,974, filed Jan. 18, 1995, entitled "Method of Stiffening a Flexible Pipe for Making a Joint", the disclosures of both of which are incorporated herein by reference in their entireties. Expander 60 differs from the conventional or smooth expander in that it further includes a hump 64 thereabout that has a profile which conforms generally in cross-section to recess 40 and is generally as thick as the recess depth ($D_R$) such that when expander 60 is operated to expand stiffener 32, portion 52 thereof is expanded more than portion 54 (if it is expanded at all), such that portion 52 is deflected by deforming radially outwardly by an amount sufficient to wedge plastic pipe wall portion 50 against collar recess 40. When portion 54 is expanded, it is thus urged radially outwardly against pipe wall 14.

Figure 4:
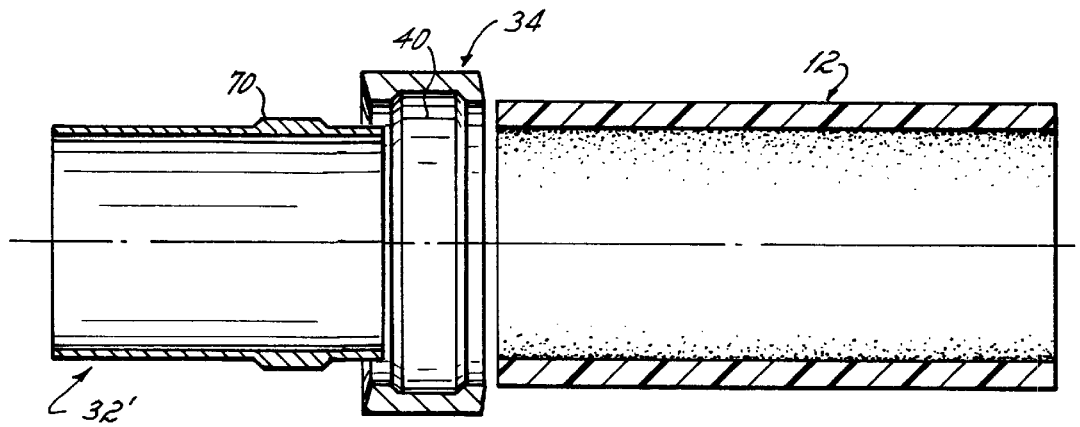
FIG. 4 is an exploded, cross-sectional view of a second version of the components of the plastic pipe adaptor of FIG. 1 prior to assembly.
Figure 5:
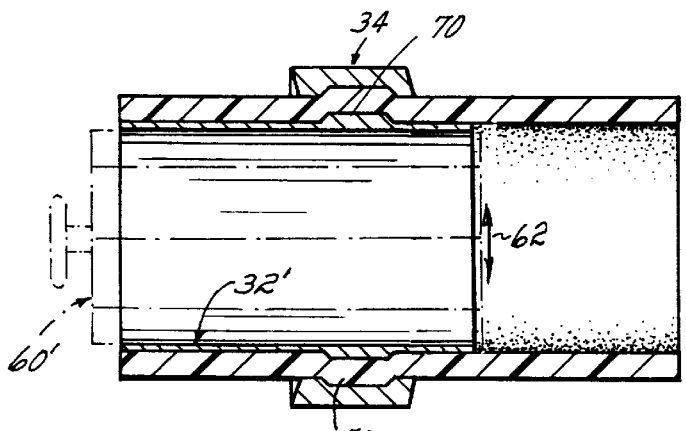
FIG. 5 is a cross-sectional, diagrammatic view of the components of FIG. 4 coaxially inserted together and showing a smooth expander for purposes of forming the plastic pipe adaptor of FIG. 1.

An alternative version allows use of a conventionally smooth expander 60' as seen in FIGS. 4 and 5. To this end, stiffener 32' includes a projection 70 thereabout that defines a pre-deflected rib or activation ring on stiffener 32'. Projection 70 in profile conforms to recess 40 as did hump 64 of expander 60. With the version of components shown in FIGS. 4 and 5, expander 60' may be a conventional or smooth expander such that as stiffener 32' is expanded generally uniformly throughout (as exemplified by double-headed arrow 62), rib or ring 70 at least radially outwardly deforms plastic, pipe wall portion 50 to create the desired wedge between projection 70 and collar recess 40 with substantially the same result as provided by the localized deformation of stiffener 32 as above described. Further alternatively, if stiffener 32' is sized for a snug fit inside pipe 12, stiffener 32' may be force fit into pipe 12 with collar 34 in place until rib 70 is situated below recess 40 to thereby deform plastic portion 50 and create the wedge. As will be readily appreciated from the foregoing, deflecting a portion of the stiffener may be accomplished either by locally radially outwardly increasing or expanding the stiffener as in the case of stiffener 32 (FIGS. 2 and 3), or by providing a pre-deflected portion such as a projection 70 as in the case of stiffener 32' (FIGS. 4 and 5).

In use of adaptor 10, and with reference to FIG. 6, a follower gland 76 is slid over pipe end 16 (before joining to pipe 24) and into engagement with collar 34 against downstream side edge 38. A gasket 78 is slid over end 18 into engagement with upstream side edge of collar 34 and end 18 is inserted into the pipe-opening 80 of mechanical joint 30. Joint 30 and gland 76 are joined together such as by T-bolts 84 pulling the flanges 86 and 88 thereof together to compress gasket 78 by cooperation of joint 30 and collar 34 so as to make a fluid-tight mechanical seal between joint 30 and pipe end 18. End 16 may also be mated to a plastic pipe 24 in a conventional manner to complete a circuit of a water pipe system, for example.

Figure 7A:
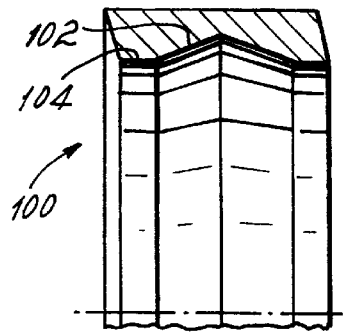
FIGS. 7A–7E are cross-sectional views of exemplary, alternative collars for use in the mechanical joint adaptor.
Figure 7B:
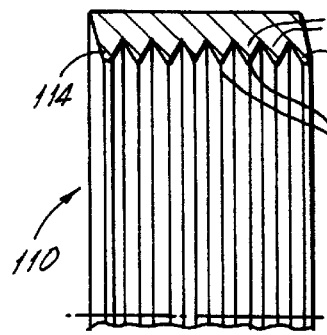
Figure 7C:
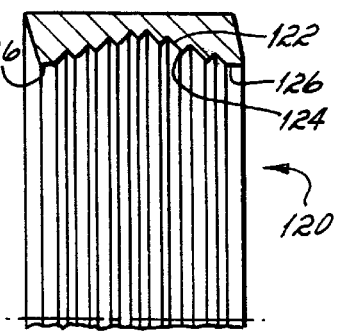
Figure 7D:
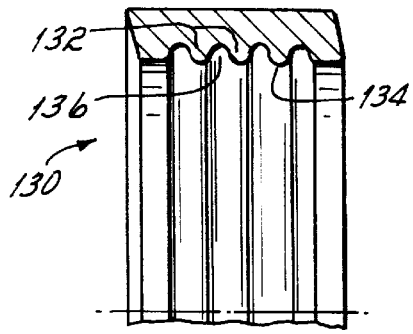
Figure 7E:
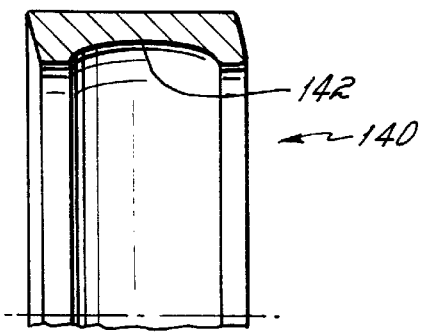
Figure 8A:
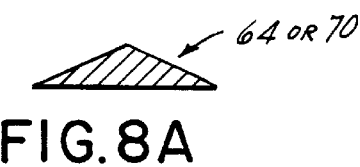
FIGS. 8A and 8B are alternative hump or rib projection profiles for use with certain of the collars shown in FIGS. 7A–7E.
Figure 8B:

Collar 34 may present other profiles in cross-section such as are shown diagrammatically in FIGS. 7A–7E. To this end, and rather than present the generally rectangular shape of recess 40, the collar may have more than one recess, and may present the recess(es) as triangular, sawtooth-shaped, arcuate, or the like. To this end, collar 100 has a triangular-shaped recess 102 defined between projections 104 (FIG. 7A); collar 110 of FIG. 7B has a plurality of intermediate projections 112 between outer projection 114 (like projections 36 of FIG. 1) with the innermost edge 116 of at least projections 112 terminating in a sharp edge to define a plurality of triangular recesses 118 therebetween (i.e., a sawtooth configuration); collar 120 of FIG. 7C is similar to collar 110 but the innermost edges 122 of intermediate projections 124 progress along the apex of a triangle such that the inner diameter defined by the intermediate projections is larger than that of the outermost projections 126; collar 130 of FIG. 7D has a plurality of projections 132 each with an arcuate innermost edge 134 to define a plurality of generally arcuate recesses 136 therebetween (i.e., a generally sinusoidal configuration); and collar 140 of FIG. 7E replaces recess 40 of collar 34 with a single arcuately-shaped crescent recess 142. In each case, either the hump 64 of expander 60 is shaped to conform generally to the above-described recess(es), or the activating ring 70 is so shaped. To this end, the profile of hump 64 or ring 70 as shown in FIGS. 2 and 4 may be used for collars 110 and 130 (with the height of hump 64 being equal to the average recess depth of the collar), whereas a triangular profile as shown in FIG. 8A may be used for collars 100 and 120 (with hump 64 being a height equal to the average recess depth for collar 120), and an arcuate profile as shown in FIG. 8B may be used for collar 140. The profile is selected and stiffener portion 52 deflected such that plastic pipe wall portion 50 is deformed to engage at least some aspects of the recess(es) and, advantageously, is caused to engage fully into the recess(es).

Figure 9A:
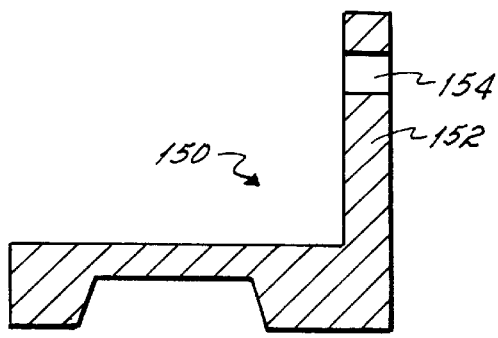
FIGS. 9A and 9B are partial cross-sectional views of alternative collars with attachment mechanisms.
Figure 9B:
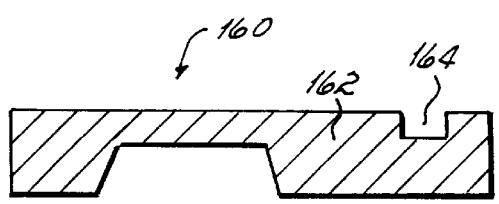

While collar 34 provides exterior walls 38 against which the components of a joint or the like may bear for mechanical attachment therebetween, the collar may include further attachment mechanisms as will be readily apparent. By way of example, as shown in FIG. 9A, collar 34 is replaced with collar 150 (having a recess configuration as above-described) which is characterized by a radially outwardly extending integral flange 152 with one or more apertures 154 therein for receiving a bolt, tie rod or other fastener (not shown). Similarly, collar 160 of FIG. 9B has an axially extending integral extension 162 with an annular groove 164 therearound for mating with a grooved coupling (not shown). The collar may further be modified to have a weld end.

By virtue of the foregoing, there is thus provided a plastic pipe adaptor that has desirable pipe end stiffening characteristics while also providing structure to mechanically secure the pipe end to another member such as a mechanical joint.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, while collar 34 is shown as a single ring, collar 34 could be provided by a plurality of segments (not shown) that are bolted together to form a continuous ring. Further, the inner diameter of the collar may be equal to or less than the outer diameter of the pipe, especially where the segmented ring is used. Also, the outer surface 43 of collar 34 may be reinforced with ribs (not shown) or otherwise modified as desired. Alternatively, collar 34 could be discontinuous in that it present a C-shape for example so as to extend about the pipe periphery by substantially more than 50% but less than 100% as in the case of collar 34. Additionally, stiffener 32 could be other than tubular shaped provided at least a portion thereof is deflected to wedge pipe wall portion 50 as necessary and further that fluid such as a water can flow through or past the stiffener as necessary for completion of the fluid circuit in use. In this regard, the plastic pipe adaptor of the present invention may also be useful for gas lines as well. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A plastic pipe adaptor comprising:
   a length of pipe having a plastic pipe wall and a coupling end;
   a substantially rigid pipe stiffener disposed effectively entirely inside the pipe;
   a substantially rigid collar disposed about the pipe exteriorly of the pipe wall and spaced entirely from the coupling end, the collar having a recess therein, the stiffener and the collar being positioned such that a portion of the plastic pipe wall is disposed between the stiffener and the collar recess; and
   at least a portion of the pipe stiffener being deflected outwardly against the pipe wall portion by an amount sufficient to wedge the pipe wall portion into engagement with the collar recess, wherein the portion being deflected outwardly is a deformed portion of the stiffener, whereby to grip the pipe wall such that fastening the collar to a member holds the pipe to said member.

2. The plastic pipe adaptor of claim 1 wherein the stiffener has an axial length such that an extended portion of the stiffener extends beyond the pipe wall portion whereby to extend beyond an area underlying the collar.

3. The plastic pipe adaptor of claim 2, the extended stiffener portion being urged outwardly against the pipe wall.

4. The plastic pipe adaptor of claim 1 wherein the pipe wall defines an outer diameter of the pipe, the collar including a pair of spaced-apart inwardly directed projections defining the recess therebetween, each projection defining a respective inner diameter that is not less than the pipe outer diameter.

5. The plastic pipe adaptor of claim 4 wherein each respective inner diameter is slightly larger than the pipe outer diameter.

6. The plastic pipe adaptor of claim 4, each inwardly directed projection having a terminal edge being generally flat in cross section.

7. The plastic pipe adaptor of claim 1, the collar recess being generally rectangular in cross section.

8. The plastic pipe adaptor of claim 1, the collar recess being generally triangular in cross section.

9. The plastic pipe adaptor of claim 1, the collar recess being generally arcuate in cross section.

10. The plastic pipe adaptor of claim 1 wherein the stiffener is comprised of metal.

11. The plastic pipe adaptor of claim 1 wherein the stiffener is generally tubular in cross-section.

12. The plastic pipe adaptor of claim 1 wherein the collar is comprised of metal.

13. The plastic pipe adaptor of claim 1 wherein the plastic pipe wall is comprised of polyolefin material.

14. The plastic pipe adaptor of claim 13 wherein the polyolefin material is polyethylene.

15. The plastic pipe adaptor of claim 1 wherein the collar is a continuous ring.

16. The plastic pipe adaptor of claim 1, the collar including an attachment mechanism.

17. The plastic pipe adaptor of claim 16, the collar attachment mechanism being an integral flange.

18. The plastic pipe adaptor of claim 16, the collar attachment mechanism being an integral, grooved extension.

19. The pipe adaptor of claim 1, wherein the pipe stiffener is disposed entirely inside the pipe.

20. A plastic pipe adaptor comprising:
    a length of pipe having a plastic pipe wall and a coupling end;
    a substantially rigid pipe stiffener disposed effectively entirely inside the pipe;
    a substantially rigid collar disposed about the pipe exteriorly of the pipe wall and spaced entirely from the coupling end, the collar having a plurality of recesses therein, the stiffener and the collar being positioned such that a portion of the plastic pipe wall is disposed between the stiffener and the collar recesses; and
    at least a portion of the pipe stiffener being deflected outwardly against the pipe wall portion by an amount sufficient to wedge the pipe wall portion into engagement with the collar recesses, whereby the portion being deflected outwardly is a deformed portion of the stiffener, whereby to grip the pipe wall such that fastening the collar to a member holds the pipe to said member.

21. The plastic pipe adaptor claim 20 wherein the recesses of the collar define a sawtooth configuration.

22. The plastic pipe adaptor claim 20 wherein the collar includes a plurality of inwardly directed projections defining the plurality of recesses therebetween.

23. The plastic pipe adaptor claim 22 wherein the projections define a triangular cross section to the recesses.

24. The plastic pipe adaptor claim 22 wherein the projections each terminate in an inwardly directed sharp edge.

25. The plastic pipe adaptor claim 20 wherein the recesses of the collar define a sinusoidal configuration.

26. The plastic pipe adaptor of claim 20 wherein the pipe wall defines an outer diameter of the pipe, the collar including a plurality of inwardly directed projections defining the recesses therebetween wherein each projection defines a respective inner diameter that is not less than the pipe outer diameter.

27. The plastic pipe adaptor of claim 26 wherein each of the respective inner diameters is slightly larger than the pipe outer diameter.

28. The pipe adaptor of claim 20, wherein the pipe stiffener is disposed entirely inside the pipe.

29. A water system comprising:
    a length of pipe having a plastic pipe wall and a coupling end;
    a substantially rigid pipe stiffener disposed effectively entirely inside the pipe;
    a substantially rigid collar disposed about the pipe exteriorly of the pipe wall and spaced entirely from the coupling end, the collar having a recess therein, the stiffener and the collar being positioned such that a portion of the plastic pipe wall is disposed between the stiffener and the collar recess;
    at least a portion of the pipe stiffener being deflected outwardly against the pipe wall portion by an amount sufficient to wedge the pipe wall portion into engagement with the collar recess whereby to grip the pipe wall;
    a gasket received over the pipe adjacent a first side of the collar;
    a follower gland received over the pipe adjacent a second, opposite side of the collar;
    a mechanical joint receiving the pipe and the gasket; and
    fastener means tightening the gland to the mechanical joint whereby to fasten the collar to the mechanical joint so as to hold the pipe to the mechanical joint.

30. The water system of claim 29, wherein the pipe stiffener is disposed entirely inside the pipe.

31. A plastic pipe adaptor comprising:
a length of pipe having a plastic pipe wall and a coupling end;
a substantially rigid pipe stiffener disposed effectively entirely inside the pipe;
a substantially rigid collar disposed about the pipe exteriorly of the pipe wall and spaced entirely from the coupling end, the collar having a recess therein, the stiffener and the collar being positioned such that a portion of the plastic pipe wall is disposed between the stiffener and the collar recess; and
a projection on the stiffener defining at least a portion of the pipe stiffener being deflected outwardly against the pipe wall portion by an amount sufficient to wedge the pipe wall portion into engagement with the collar recess, whereby to grip whereby to grip the pipe wall such that fastening the collar to a member holds the pipe to said member.

32. The plastic pipe adaptor of claim 31 wherein the stiffener has an axial length such that an extended portion of the stiffener extends beyond the pipe wall portion whereby to extend beyond an area underlying the collar.

33. The plastic pipe adaptor of claim 32, the extended stiffener portion being urged outwardly against the pipe wall.

34. The plastic pipe adaptor of claim 31 wherein the pipe wall defines an outer diameter of the pipe, the collar including a pair of spaced-apart inwardly directed projections defining the recess therebetween, each projection defining a respective inner diameter that is not less than the pipe outer diameter.

35. The plastic pipe adaptor of claim 34 wherein each respective inner diameter is slightly larger than the pipe outer diameter.

36. The plastic pipe adaptor of claim 34, each inwardly directed projection having a terminal edge being generally flat in cross section.

37. The plastic pipe adaptor of claim 31, the collar recess being generally rectangular in cross section.

38. The plastic pipe adaptor of claim 31, the collar recess being generally triangular in cross section.

39. The plastic pipe adaptor of claim 31, the collar recess being generally arcuate in cross section.

40. A plastic pipe adaptor comprising:
a length of pipe having a plastic pipe wall and a coupling end;
a substantially rigid pipe stiffener disposed effectively entirely inside the pipe;
a substantially rigid collar disposed about the pipe exteriorly of the pipe wall and spaced entirely from the coupling end, the collar having a plurality of recesses therein, the stiffener and the collar being positioned such that a portion of the plastic pipe wall is disposed between the stiffener and the collar recesses; and
a projection on the stiffener defining at least a portion of the pipe stiffener being deflected outwardly against the pipe wall portion by an amount sufficient to wedge the pipe wall portion into engagement with the collar recesses whereby to grip the pipe wall such that fastening the collar to a member holds the pipe to said member.

41. The plastic pipe adaptor claim 40 wherein the recesses of the collar define a sawtooth configuration.

42. The plastic pipe adaptor claim 40 wherein the collar includes a plurality of inwardly directed projections defining the plurality of recesses therebetween.

43. The plastic pipe adaptor claim 42 wherein the projections define a triangular cross section to the recesses.

44. The plastic pipe adaptor claim 42 wherein the projections each terminate in an inwardly directed sharp edge.

45. The plastic pipe adaptor claim 40 wherein the recesses of the collar define a sinusoidal configuration.

46. The plastic pipe adaptor of claim 40 wherein the pipe wall defines an outer diameter of the pipe, the collar including a plurality of inwardly directed projections defining the recesses therebetween wherein each projection defines a respective inner diameter that is not less than the pipe outer diameter.

47. The plastic pipe adaptor of claim 46 wherein each of the respective inner diameters is slightly larger than the pipe outer diameter.

48. A plastic pipe adaptor comprising:
a length of pipe having a plastic pipe wall and a coupling end;
a substantially rigid pipe stiffener disposed effectively entirely inside the pipe;
a substantially rigid collar disposed about the pipe exteriorly of the pipe wall and spaced entirely from the coupling end, the collar having a recess therein and a radially outwardly extending integral flange, the stiffener and the collar being positioned such that a portion of the plastic pipe wall is disposed between the stiffener and the collar recess; and
at least a portion of the pipe stiffener being deflected outwardly against the pipe wall portion by an amount sufficient to wedge the pipe wall portion into engagement with the collar recess whereby to grip the pipe wall such that fastening the collar to a member holds the pipe to said member.

* * * * *

UNITED STATES PATENT AND TRADEMARK OFFICE
CERTIFICATE OF CORRECTION

PATENT NO. : 5,967,568
DATED : October 19, 1999
INVENTOR(S) : Edwin A. Bird

It is certified that error appears in the above-identified patent and that said Letters Patent is hereby corrected as shown below:

In claim 21, column 8, line 22, change "adaptor claim 20" to --adaptor of claim 20--.

In claim 22, column 8, line 24, change "adaptor claim 20" to --adaptor of claim 20--.

In claim 23, column 8, line 27, change "adaptor claim 22" to --adaptor of claim 22--.

In claim 24, column 8, line 29, change "adaptor claim 22" to --adaptor of claim 22--.

In claim 25, column 8, line 31, change "adaptor claim 20" to --adaptor of claim 20--.

In claim 31, column 9, line 18, change "whereby to grip whereby to grip the" to --whereby to grip the--.

In claim 41, column 10, line 12, change "adaptor claim 40" to --adaptor of claim 40--.

In claim 42, column 10, line 14, change "adaptor claim 40" to --adaptor of claim 40--.

In claim 43, column 10, line 17, change "adaptor claim 42" to --adaptor of claim 42--.

In claim 44, column 10, line 19, change "adaptor claim 42" to --adaptor of claim 42--.

In claim 45, column 10, line 21, change "adaptor claim 40" to --adaptor of claim 40--.

Signed and Sealed this

Twenty-ninth Day of May, 2001

*Attest:*

NICHOLAS P. GODICI

*Attesting Officer*     *Acting Director of the United States Patent and Trademark Office*